June 11, 1963 E. J. DAVID 3,092,940
METHOD OF AND APPARATUS FOR MAKING A SUPPOSITORY PACKAGE
Filed June 6, 1961 4 Sheets-Sheet 1

INVENTOR.
Edward J. David,
BY
ATTORNEY

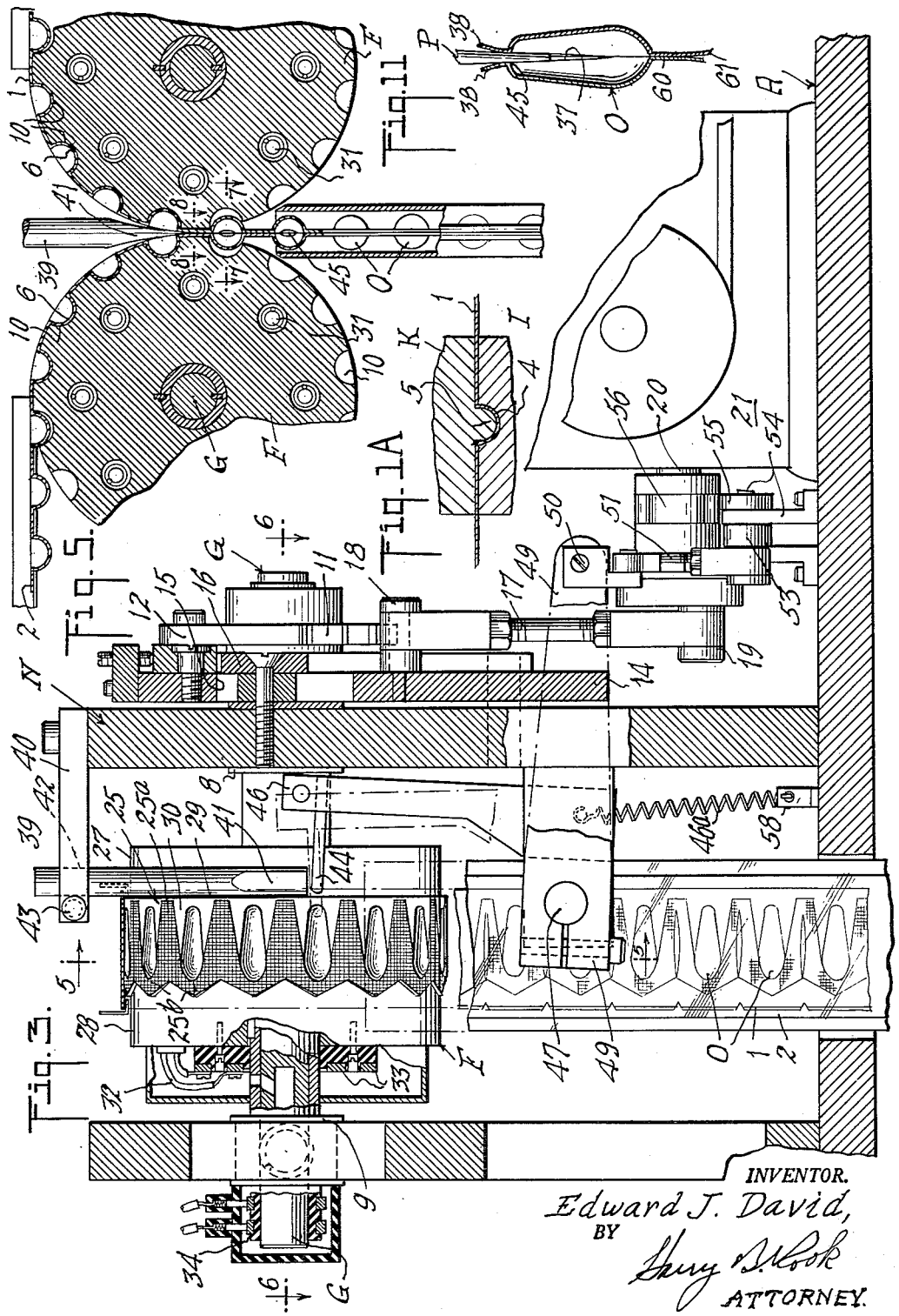

June 11, 1963 E. J. DAVID 3,092,940
METHOD OF AND APPARATUS FOR MAKING A SUPPOSITORY PACKAGE
Filed June 6, 1961 4 Sheets-Sheet 3
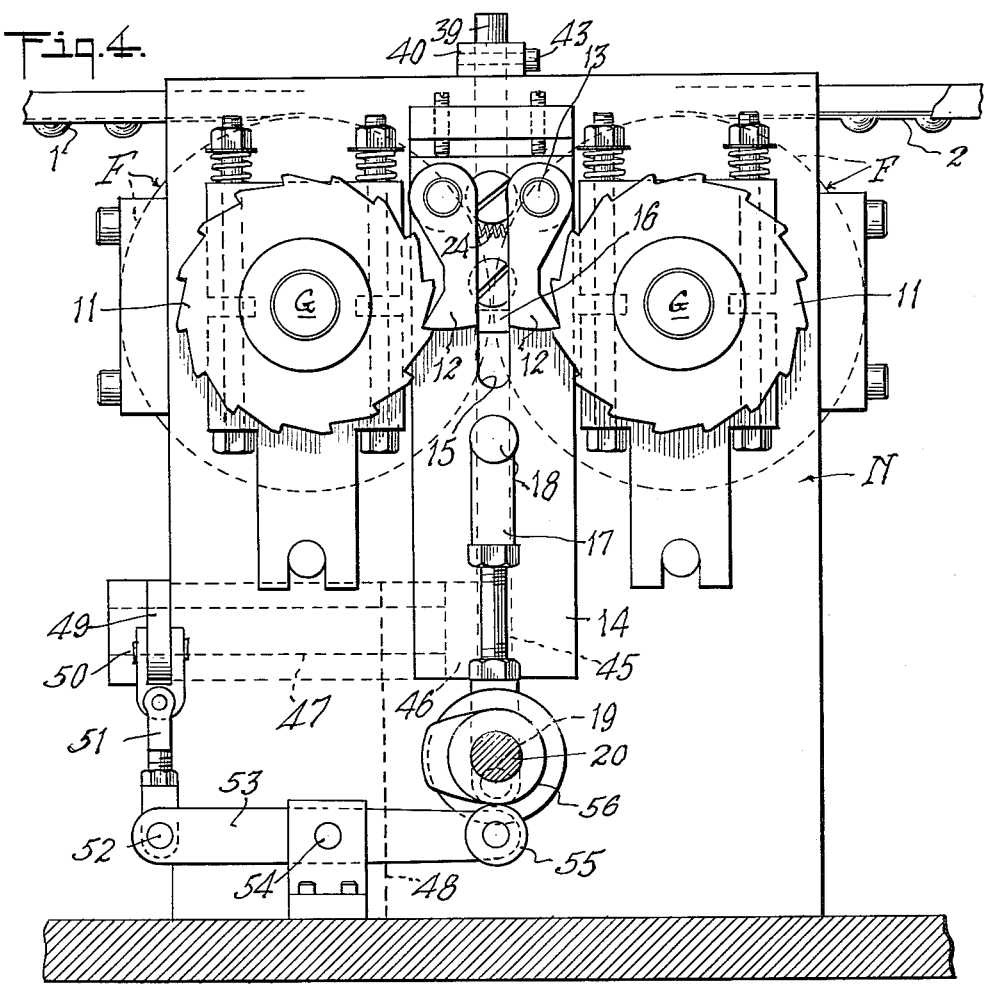
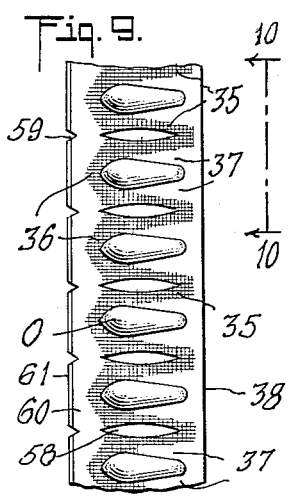
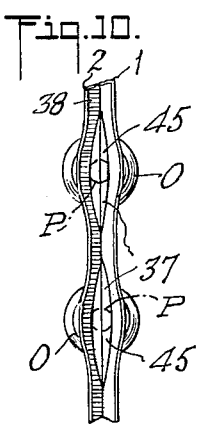
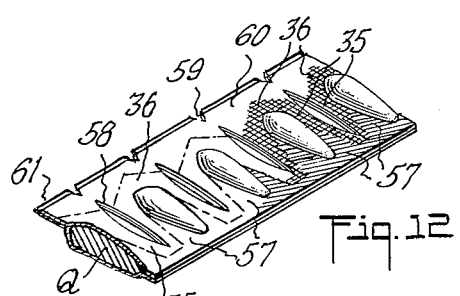
INVENTOR.
Edward J. David,
BY
ATTORNEY June 11, 1963  E. J. DAVID  3,092,940
METHOD OF AND APPARATUS FOR MAKING A SUPPOSITORY PACKAGE
Filed June 6, 1961  4 Sheets-Sheet 4
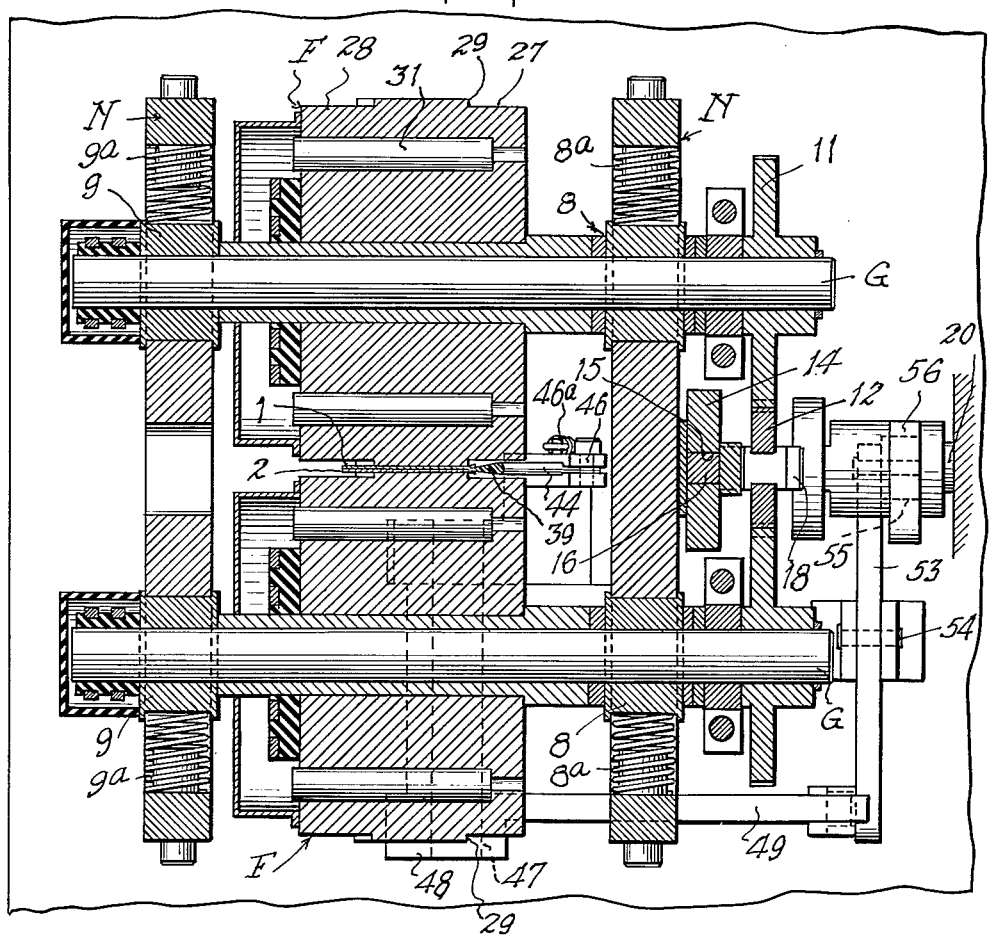
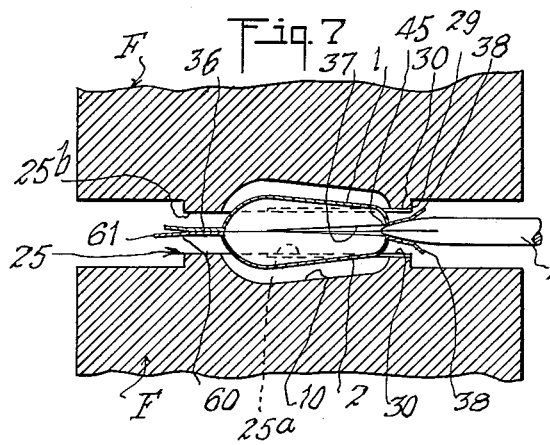
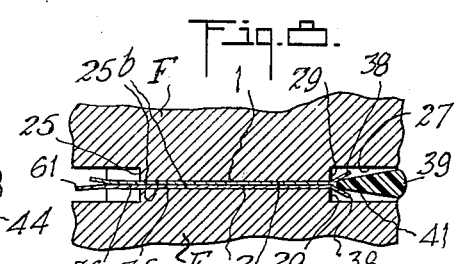
INVENTOR.
Edward J. David,
BY
Harry B. Cook
ATTORNEY United States Patent Office 3,092,940
Patented June 11, 1963

3,092,940
METHOD OF AND APPARATUS FOR MAKING A SUPPOSITORY PACKAGE
Edward J. David, Point Pleasant, N.J., assignor to Ivers-Lee Company, Newark, N.J., a corporation of New Jersey
Filed June 6, 1961, Ser. No. 115,148
12 Claims. (Cl. 53—29)

This invention relates in general to the art of packaging, particularly the packaging of materials that are initially fluent or capable of flowing, and more especially the invention contemplates a method of and apparatus for making a package of opposed layers of relatively thin packaging material such as aluminum foil, sealed together in certain zones which form the boundaries of a compartment or chamber between said layers in which is disposed the fluent material being packaged, which, when producing some articles such as suppositories, hardens after the sealing of the package. A somewhat similar package is disclosed in my co-pending application, Serial No. 832,029, filed August 6, 1959, now Patent No. 3,039,246.

According to one method of making packages of this general character prior to said application, the compartment walls extend to one edge of the package strip in such a way that the packaging material is greatly deformed or stretched, and the sheets of packaging material along said edge of the strip are pressed together as by rollers in an effort to seal the compartments, but the deformed or stretched portions of the sheets fold or wrinkle or crack so that the sheets cannot be brought into tight uniform contact with each other in the sealing zones and consequently small passages are left in the folds or wrinkles through which the packaged material might leak from the compartments or air or liquid might undesirably gain entrance into the compartments and deleteriously affect the material packaged in the compartments.

In another method of making packages of this type, the packaging sheets are sealed together along one edge portion in such a way as to leave small passages for the insertion of filling nozzles for filling the compartments, and when the nozzles are inserted into said packages, the packaging sheets are bent or forced apart in such a way as to deform the walls of the compartments and also deform the portions of the packaging sheets between the compartments and said edges of the sheets, which not only interferes with the fluid-tight sealing of the compartments but deforms the compartment walls. Also, due to variations in the capacity of the compartments as a result of the deformation of the walls thereof, sometimes the material being packaged is forced entirely out of the compartments so that the finished packages do not contain the prescribed amount of the packaged material.

The present invention constitutes an improvement upon the method and package disclosed in the aforesaid application which are improvements on the known methods and packages. In the method and package of said application, identical recesses are formed in sheets of ductile material such as aluminum, the sheets are arranged opposite each other and sealed together between sealing rolls in zones extending from points adjacent one edge toward the other edge of the sheets and partially surrounding said recesses with one recess of each sheets facing a recess of the other sheet while maintaining said sheets in nonadherent relation in zones between said recesses and the first-mentioned zones and extending to the second-mentioned edge of the sheets, thereby forming package compartments each having an opening at the end adjacent the second-mentioned edge of the sheets, filling the compartments through the open ends thereof and after sealing the sheets together in the second-mentioned zones and along the second-mentioned edges of the sheets to thereby close the open ends of the compartments.

A primary object of the invention is to provide a method of and apparatus for making packages of the character described wherein the edges of the packaging strips adjacent which the open ends of the compartments are provided, are formed in a novel and improved manner to facilitate the insertion of the nozzles of a filling machine into the open ends of the compartments with a minimum of stretching, deformation or distortion of the packaging sheets and compartment walls, and to provide for fluid-tight sealing of the compartments along said edges of the packaging sheets without any rippling or folding of the packaging material such as might cause cracking of the material or passages through the folds or ripples thereof.

Another object of the invention is to provide a method and apparatus wherein the packages shall be made in continuous strip formation, the sheets or strips of ductile packaging material shall pass between sealing rolls to partially form the packages preliminarily to filling thereof, and the edges of the packaging strips shall be formed automatically during passage of the strips between the sealing rolls to provide filling openings to easily and accurately receive the nozzles of a filling machine without distortion of the compartment walls and with a minimum of deformation of the edge portions of said strips which are to be sealed together to close the compartments and complete the packages.

A further object is to provide such a method and apparatus wherein the sheets or strips along one edge thereof outwardly of the sealed zones are spread apart in a novel and improved manner by engagement with a spreader to guide a novel and improved automatic insertion of a pin between the sheets or strips to form the filling openings. Other objects, advantages and results of the invention will be brought out by the following description in conjunction with the accompanying drawings in which:

FIGURE 1A is an enlarged fragmentary vertical sectional view through portions of the dies for forming the recesses in the strips of packaging material;

FIGURE 3 is an enlarged fragmentary vertical sectional view approximately on the plane of the line 3—3 of FIGURE 2;

FIGURE 4 is a fragmentary rear elevation of a portion of the machine including the sealing rolls and the actuating mechanism therefor, from the plane of the line 4—4 of FIGURE 2;

FIGURE 5 is a fragmentary vertical longitudinal sectional view through the sealing rolls approximately on the plane of the line 5—5 of FIGURE 3;

FIGURE 6 is a fragmentary horizontal sectional view on the plane of the line 6—6 of FIGURE 3;

FIGURE 7 is a greatly enlarged horizontal sectional view through portions of the sealing rolls on the plane of the line 7—7 of FIGURE 5;

FIGURE 8 is a similar view on the plane of the line 8—8 of FIGURE 5;

FIGURE 9 is a plan view of a strip of partially completed packages;

FIGURE 10 is a fragmentary edge view of two of the packages from approximately the plane of the line 10—10 of FIGURE 9, nozzles of a filling machine for depositing material to be packaged in the compartments being shown in dot-and-dash lines;

FIGURE 11 is a vertical sectional view through the compartment of one of the partially formed packages showing the nozzle of a filling machine inserted into the compartment for depositing the material being packaged in the compartment; and FIGURE 12 is a perspective view of a strip of completed packages, with portions broken away.

Figure 1:
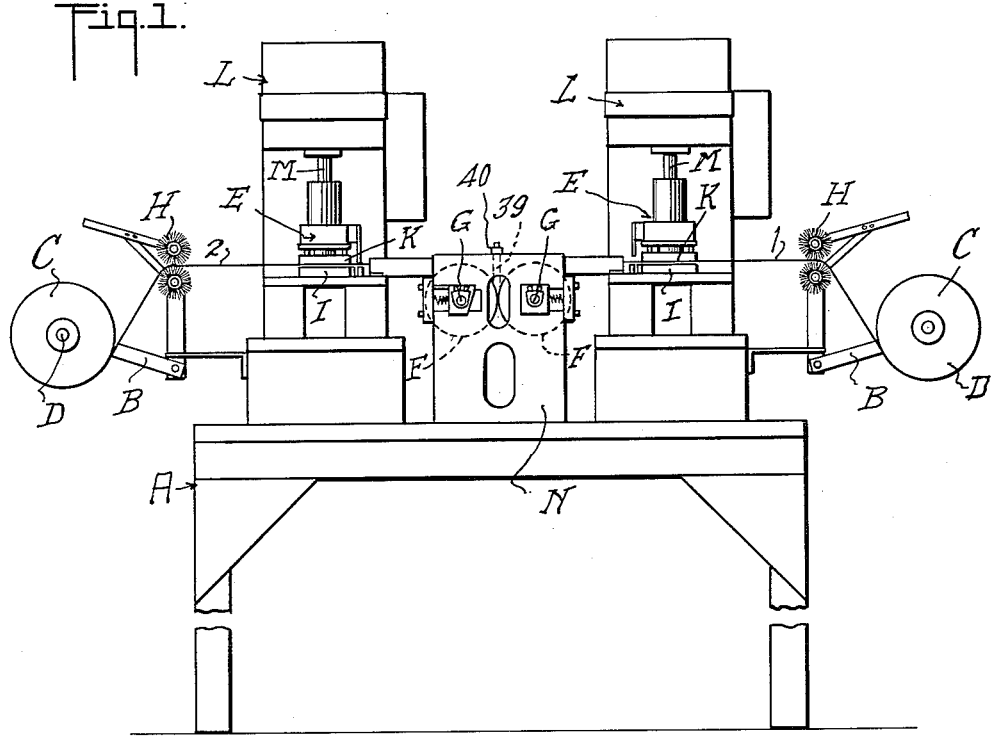
FIGURE 1 is a schematic front elevation of an apparatus or machine for making packages in accordance with the invention.
Figure 2:
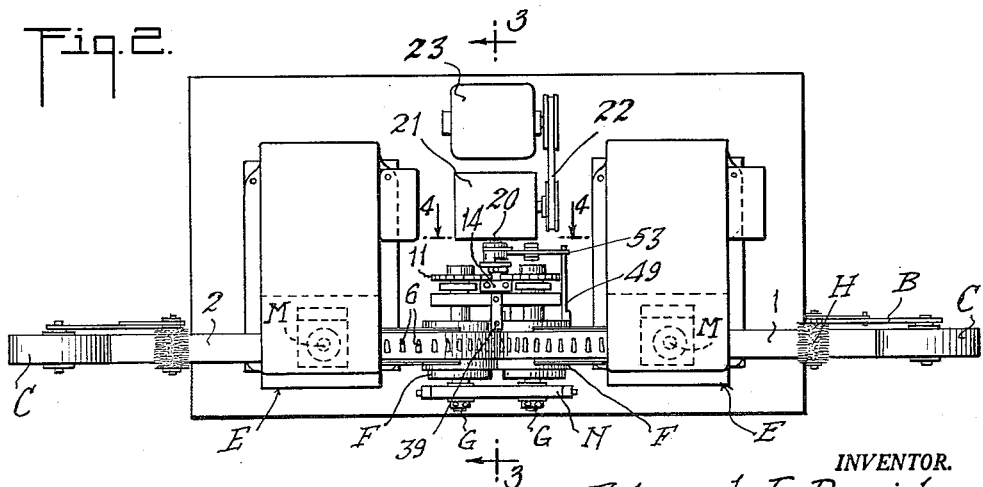
FIGURE 2 is a top plan view of the machine.

Specifically describing the illustrated embodiment of the invention, the reference character A designates the frame or table of an apparatus or machine which has thereon support brackets B on which rolls C of strips of ductile packaging material, for example aluminum, are journaled for rotation about spindles D so that the strips 1 and 2 of the packaging material can be simultaneously withdrawn from their respective rolls, each passed through a die mechanism E which form the recesses for the packaging compartments, and thence between identical sealing rolls F, F, where the strips 1 and 2 are sealed together to partially form the packages preparatory to the filling and final sealing or closing of the packages. The abutting surfaces of the strips are thermoplastic or coated with thermoplastic material.

The die mechanisms may be of any suitable construction but each is shown as comprising a bed die I fixedly mounted on the frame A, and a head die K that is reciprocal toward and from the bed die by a suitable power unit such as a reciprocating pneumatic motor L on the piston rod M of which the head die is mounted. In the present instance, the bed die I has at least one recess 4 with which cooperates a boss 5 on the head die (see FIGURE 1A). Obviously as each head die is moved into contact with the bed die with the strip of packaging material between them under tension and in contact with the head die as shown in FIGURE 1, recesses 6 are simultaneously formed in the two strips 1 and 2, the tension of the strips serving to withdraw the strips from the bed dies. Each recess in strip 1 is complemental to a recess of the other strip to form a complete package compartment when the strips are brought into contact with each other with the concave side of the recess of one strip facing the concave side of the recess of the other strip, and obviously the recesses may be of any shape that will produce a package of the desired configuration.

The two strips 1 and 2 are withdrawn from the rolls C with an intermittent or step-by-step motion in timed relation to the reciprocation of the head dies. The pulling of the strips from the rolls is shown as effected by the sealing rolls F each of which has a shaft G journaled in bearings 8 and 9 on a superstructure N of the frame A, springs 8a and 9a (see FIGURE 6) being provided to cause the rolls to yieldingly grip the strips between them. Each roll has a plurality of cavities 10 in its periphery to receive the protuberances on the corresponding strip 1 or 2 produced by the formation of the recesses in the strips, the spacing of the cavities, of course, corresponding to the spacing of the recesses 6.

On each of the shafts G is fixed a ratchet disc 11 with which cooperates one end of a pawl 12 which is pivotally mounted at its other end as indicated at 13 on an actuating slide 14. The slide is shown as having a slot 15 through which extends a guide block 16 that is fixedly mounted on a frame superstructure N, and the slide is shown as reciprocated by a connecting rod 17 which is pivotally connected at one end at 18 to the slide and is connected at its other end to a crank pin 19 of the takeoff shaft 20 of a speed reducing gear mechanism 21 (see FIGURE 3) the in-put shaft of which has a belt and pulley connection 22 with an electric motor 23. The pawls 12 are normally biased into engagement with the corresponding ratchet disc by a compression spring 24 interposed between the two pawls, and with this construction, it will be understood that upon starting of the motor 23, for example, by a manually controlled switch, the slide 14 will be reciprocated and the sealing rolls will be rotated in opposite directions step-by-step by coaction of the pawls 12 and ratchet discs, and thereby the strips 1 and 2 of packaging material will be moved step-by-step between the sealing rolls. As the strips 1 and 2 pass between the sealing rolls, they are sealed together in zones partially surrounding the compartments formed by the juxtaposed recesses of the two strips to partially form the packages preliminarily to filling thereof.

Each sealing roll has a circumferential sealing area 25 of a length in the direction parallel to the axis of the roll approximately equal to the width of the intended sealed zone of the package strip, and each roll has reduced portions 27 and 28 at opposite ends of the sealing area 25 providing a circumferential shoulder 29 between the sealing zone and the reduced portion 27. The sealing area has sealing zones partially surrounding the recesses 10, said sealing zone including a portion 25a having one end closely spaced from the shoulder 29 with one margin coincident with the adjacent edge of the recess near one end thereof and flaring away from said edge of the recess toward the shoulder 29; and two adjacent portions 25a, one at each side of a recess, are connected by another portion 25b that closely surrounds the corresponding end of the recess. Between the edges of the portions 25a and the edges of the corresponding recess, the sealing area has relieved or depressed portions 30 such that the sealing portions 25a and 25b can firmly press and seal the strips 1 and 2 together while the portions 30 will leave the strips in non-adherent relation to each other to facilitate separation of the strips. Preferably the sealing rolls are heated in any suitable manner, for example by electric heaters 31 that are connected in circuit by wires 32 through collector rings 33 and 34 to a source of electricity.

From the foregoing it will be understood that as the strips 1 and 2 are fed step-by-step upon rotation of the sealing rolls, the strips will be positively sealed together in zones 35 and 36 corresponding to the zones 25a and 25b of the sealing rolls and the two strips will be unsealed and in non-adherent relation to each other in zones 37 corresponding to the zones 30 of the sealing rolls; and the corresponding edge portions of the strips will be unsealed throughout their lengths as indicated at 38. Thus a plurality of partially formed compartments O are provided between the strips.

An important feature of the invention is means for shaping or forming said unsealed edge portions in such a manner as to provide a filling opening for each compartment. As shown in several of the figures and best illustrated in FIGURE 8, as the strips 1 and 2 move into contact with each other between the rolls, their unsealed edge portions 38 project beyond the corresponding shoulders 29 of the sealing rolls, and a spreader 39 has a thin chisel-shaped edge disposed between said edge portions so as to bend or spread them apart and provide a longitudinal groove between them extending continuously lengthwise the strips. As shown, the spreader 39 comprises a rod of suitable material such as nylon mounted in the bracket arm 40 secured to the superstructure N of the machine frame, the spreader being preferably adjustable in the bracket arm to properly locate the chisel-shaped edge 41 of the spreader in the proper relation to the edge portion of the strips 1 and 2. Also as shown, the bracket arm has an opening 42 in which the rod is slidable, and the end of said bracket beyond said opening is bifurcated with the arms of the bifurcation connected by a thumb screw 43 for clamping the rod in adjusted positions.

The spreader conditions or shapes the edge portions of the sealed strips to facilitate the insertion between the unsealed portions of the strips of a forming pin 44 for producing a filling opening 45 for the compartments between the unsealed edge portions of the strips and leading into the compartment. Normally the forming pin 44 is withdrawn to a position beyond the edges of the sealed strips as shown by solid lines in FIGURE 3 but is intermittently actuated into a position between the unsealed edge portions of each strip at each compartment as shown by dot-and-dash lines in FIGURE 3, the pin obviously being actuated in timed relation to the movement of the sealing rolls. While any suitable means may be utilized for mounting and actuating the pin, the pin is shown as mounted on the end of a mounting arm 46 which is fast connected to the end of a stub shaft 47 that is journaled in a suitable bearing 48 on the frame and has connected thereto a lever arm 49 which is in turn connected at 50 to one end of a link 51 the other end of which is pivotally connected at 52 to a driving lever 53 pivotally mounted intermediate its ends at 54 on the frame and having thereon a follower roller 55 that engages a cam 56 on the power take-off shaft 20. A tension spring 46a is connected between the mounting arm 46 and the frame as indicated at 58 for actuating the forming pin 44 into its normal position as shown by dotted lines in FIGURE 3, while the cam 56 positively actuates the mounting arm 46 and forming pin 44 to push the latter between the spread apart edge portions of the strips 1 and 2 and into the compartments as shown in FIGURE 9 so as to provide a filling opening 45 for each compartment into which a nozzle P of a filling machine may be inserted for depositing material to be packaged in the compartment as best shown in FIGURE 11.

It will be noted that the partially completed packages thus formed have the unsealed portions 37 flaring outwardly to the corresponding edges of the strips and that there is a minimum of bending or deformation of the unsealed portions, and it will also be observed, particularly with reference to FIGURES 7 and 12, that the compartment walls may be slightly pressed apart by the forming pin 44 and the filling nozzles with no distortion or deformation of the compartment walls, the unsealed portions spreading apart between distantly spaced points, i.e., the edges of the sealed zones 35.

After the predetermined quantity of material has been placed in the compartments, the packages are completed by simultaneously sealing the strips 1 and 2 together in zones 57 that extend from the zones 35 to the margins of the compartments beyond the ends of the compartments opposite the zones 36 and partially overlap the zones 35 as best shown in FIGURE 12. Thus the initially unsealed zones 37 are positively sealed together and the compartments are thereby closed. While it is not absolutely essential, it is desirable that the sealed zones be crimped and for this purpose, the sealing area portions 25a and 25b of the sealing rolls are preferably serrated as are also the juxtaposed faces of the dies between which the sealed zones 57 are formed. At the present time the sealed zones 57 are formed by power operated crimping jaws.

An important feature and advantage of the method and apparatus is that the sealed zones 57 can be made absolutely fluid-tight without any wrinkling, folding or cracking of the strips 1 and 2 as the first unsealed zones 37 of the partially formed packages are completely sealed together to provide the final sealed zones 57. Therefore the strips can be brought into tight uniform contact with each other and the possibility of the formation of small passages or cracks in the strips through which air or liquid might either leave or enter into the compartments is reduced to the minimum.

While it is probably known to those skilled in the art, it may be said that in the formation of recesses in aluminum strips by dies as above described, it is desirable that at least the underside of each of the strips 1 and 2 be lubricated to prevent the tearing of the aluminum strip in the die cavity, and for this purpose the lowermost brush H (FIGURE 1) may have a suitable lubricant applied thereto for transfer to the corresponding strip 1 or 2 as the latter is pulled from its supply roll C.

To facilitate separating the individual packages from the package strip, the strips 1 and 2 may be initially formed with slits 58 between the compartment recesses and terminating short of the edges of the strips, and the strips may also be formed with notches 59 along one edge in alignment with the slits, so that the strip can be easily torn through the notches and the slits.

Also to facilitate opening of the individual packages, i.e., the pulling apart of the two strips to release the contents of the compartments such as indicated at Q in FIGURE 12, one edge portion of one strip may extend beyond the edge portion of the other strip as indicated at 60 and the corresponding edge portions of the strips may be left in non-adherent relation to each other as indicated at 61, so that the two strips can be readily separated with a peeling action.

The now preferred embodiment of the invention has been illustrated and described, but it will be understood that many modifications and changes in the method and in the construction of the machine may be made within the spirit and scope of the invention.

I claim:

1. The method of making packages consisting of forming identical recesses in two strips of ductile material, bringing said strips into contact with each other with the recess of each strip facing the recess of the other strip and sealing the strips together in a zone extending in partially surrounding relation to said recesses between one end thereof and the corresponding edges of the strips while maintaining portions of said strips in non-adherent relation in zones between said recesses and said sealed zones and extending to the other edges of said strips, thereby forming a package compartment, spreading apart the edges of said non-adherent portions of the strips, and successively inserting and removing a forming pin into and from each compartment between said spread-apart edges thereby forming a filling opening for the compartment between said non-adherent portions of the strips.

2. The method of making packages consisting of forming identical recesses in equidistantly spaced apart relation in two strips of ductile material, bringing said strips step-by-step longitudinally into contact with each other with one recess of each strip facing a recess of the other strip and sealing the strips together in zones extending in partially surrounding relation to said recesses between one end thereof and the corresponding edges of the strips and between adjacent recesses and to points in spaced relation to the opposite edges of the strips while maintaining portions of said strips in non-adherent relation in zones between said recesses and said sealed zones and extending to the second-mentioned edges of the strips, spreading apart the edges of the non-adherent portions of the strips while the strips are moved step-by-step longitudinally, and forming a filling opening in each compartment between said non-adherent portions of the strips inwardly of the spread-apart edges of the strips as the compartment reaches a pre-determined point in its step-by-step movement.

3. The method of making packages consisting of forming identical recesses in equidistantly spaced apart relation in two strips of ductile material, bringing said strips step-by-step longitudinally into contact with each other with one recess of each strip facing a recess of the other strip and sealing the strips together in zones extending in partially surrounding relation to said recesses between one end thereof and the corresponding edges of the strips and between adjacent recesses and to points in spaced relation to the opposite edges of the strips while maintaining portions of said strips in non-adherent relation in zones between said recesses and said sealed zones and extending to the second-mentioned edges of the strips, spreading apart the edges of the non-adherent portions of the strips while the strips are moved step-by-step longitudinally, and successively inserting and removing a forming pin into and from each compartment between said spread apart edges as the compartment reaches a predetermined point in its step-by-step movement, thereby forming filling openings for the compartments between said non-adhered portions of the strips.

4. The method as defined in claim 1 with the additional steps of filling said compartments through said filling openings, and thereafter sealing said non-adherent portions of the strips together in zones extending from the first-mentioned sealed zones to the recesses and around and closing the open ends of the compartments to complete the packages.

5. A machine for making packages comprising a frame, means for forming identical recesses in equidistantly spaced apart relation in each of two flexible thin strips of ductile material, a pair of sealing rolls journaled in said frame rotatable in opposite directions receiving said strips between them with one recess of each strip facing a recess of the other strip, each sealing roll having a circumferential sealing area provided with a shoulder at one end beyond which extend the corresponding longitudinal edges of said strips, said sealing areas having recesses to receive the protuberances formed by the recesses in said strips and said sealing area having portions for sealing said strips in zones extending in partially surrounding relation to said recesses between one end thereof and the corresponding edges of the strips and between adjacent recesses, said portions of the sealing area extending to points in spaced relation to the opposite edges of the strips, and there being also other portions on said sealing rolls adjacent said sealing areas maintaining portions of the trips in non-adherent relation in zones between said recesses and the first-mentioned portions of the sealing areas and extending to said shoulders of the sealing areas, means for rotating the sealing rolls to move the strips between the rolls, means for yieldingly biasing the rolls toward each other to press the strips between them, a spreader mounted on said frame adjacent the bight between said rolls disposed between the edges of said strips that project beyond said shoulders of the sealing areas for spreading apart said edges.

6. A machine as defined in claim 5 with the addition of a forming pin for producing a filling opening between the non-adherent portions of the strips for each compartment and means for moving said forming pin between said spread-apart edges of the strip into each compartment.

7. A machine as defined in claim 6 wherein the means for rotating the rolls rotates them step-by-step, the last-named means actuating the forming pin in timed relation to the rotation of the sealing rolls to enter the compartments in succession.

8. A machine for making packages from two strips of thin flexible ductile material having identical recesses in equidistantly spaced apart relation, said machine including a frame, a pair of sealing rolls journaled in said frame rotatable in opposite directions receiving said strips between them with one recess of each strip facing a recess of the other strip, each sealing roll having a circumferential sealing area provided with a shoulder at one end beyond which extend the corresponding longitudinal edges of said strips, said sealing areas having recesses to receive the proturberances formed by the recesses in said strips and also having portions for sealing said strips in zones extending in partially surrounding relation to said recesses between one end thereof and the corresponding end of the sealing area and between adjacent recesses, said portions of the sealing area extending to points in spaced relation to said shoulder of the sealing area and there being also other portions on said sealing rolls adjacent said sealing area maintaining portions of the strips in non-adherent relation to each other in zones between said recesses and the first-mentioned portions of the sealing areas and extending to said shoulders of the sealing areas, means for rotating the sealing rolls to move the strips between the rolls, means for yieldingly biasing the rolls toward each other to grip the strips between them, and a spreader mounted on said frame and having a chisel-shaped edge adjacent the bight between said rolls providing for the passage of said edges of the strips that project beyond said shoulders of the sealing areas at opposite sides of said chisel shaped edge of the spreader, thereby to spread said edges apart.

9. A machine as defined in claim 8 wherein each sealing roll has a shaft journaled in said frame and the means for rotating the sealing rolls includes a ratchet disc rigidly connected to each shaft, a pawl coacting with each ratchet disc, an actuating slide reciprocably mounted on said frame and upon which said pawls are pivotally mounted, and means for reciprocating said slide, providing for rotation of said sealing rolls simultaneously by said pawls and ratchets in opposite directions.

10. A machine as defined in claim 8 with the addition of a forming pin for producing a filling opening for each compartment between the non-adherent portions of the strips, and means for moving said pin endwise between said spread apart edges of the strip into each compartment.

11. A machine as defined in claim 10 wherein the means for rotating the rolls rotates them step-by-step simultaneously in opposite directions, and the last-named means actuating the forming pin comprises a stub shaft journaled in said frame having an arm rigidly connected thereto in which is mounted said forming pin for movement into and out of the compartments upon oscillation of said arm in opposite directions, respectively, and means for oscillating said stub shaft in timed relation to the step-by-step rotation of said rolls.

12. A machine as defined in claim 11 wherein the last-named means includes a motor-driven power shaft having a cam thereon, a follower lever for said cam pivotally mounted on said frame, a lever arm rigidly connected to said stub shaft and a link pivotally connecting said lever arm and said follower lever.

References Cited in the file of this patent
UNITED STATES PATENTS

| | | |
|---|---|---|
| 2,199,210 | Scherer | Apr. 30, 1940 |
| 2,387,747 | Cowley | Oct. 30, 1945 |
| 2,420,983 | Salfisberg | May 20, 1947 |
| 2,468,517 | Salfisberg | Apr. 26, 1949 |
| 2,691,259 | Weckesser | Oct. 12, 1954 |
| 2,840,961 | Karpowicz | July 1, 1958 |
| 2,902,808 | Lang | Sept. 8, 1959 |

FOREIGN PATENTS

| | | |
|---|---|---|
| 780,291 | Great Britain | July 31, 1957 |